(12) United States Patent
Chang et al.

(10) Patent No.: US 10,114,555 B2
(45) Date of Patent: Oct. 30, 2018

(54) SEMICONDUCTOR DEVICE HAVING REGISTER SETS AND DATA PROCESSING DEVICE INCLUDING THE SAME

(71) Applicant: Samsung Electronics Co., Ltd., Suwon-si, Gyeonggi-do (KR)

(72) Inventors: Sil Wan Chang, Yongin-si (KR); Byung Gook Kim, Hwaseong-si (KR); Jae Young Kwon, Hwaseong-si (KR); Jong Youl Lee, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 15/263,730

(22) Filed: Sep. 13, 2016

(65) Prior Publication Data

US 2017/0115880 A1    Apr. 27, 2017

(30) Foreign Application Priority Data

Oct. 26, 2015    (KR) .................... 10-2015-0148818

(51) Int. Cl.
*G11C 8/00* (2006.01)
*G06F 3/06* (2006.01)

(52) U.S. Cl.
CPC .......... *G06F 3/061* (2013.01); *G06F 3/0659* (2013.01); *G06F 3/0679* (2013.01)

(58) Field of Classification Search
CPC .................... G11C 29/42; G11C 2211/4062
USPC ............. 365/230.03, 189.011, 185.17, 200
See application file for complete search history.

(56) References Cited

U.S. PATENT DOCUMENTS

| | | | |
|---|---|---|---|
| 6,744,670 B2 * | 6/2004 | Tamada | G11C 11/5628 365/185.18 |
| 6,912,160 B2 | 6/2005 | Yamada | |
| 6,925,558 B2 | 8/2005 | Kendall | |
| 7,679,133 B2 | 3/2010 | Son et al. | |
| 7,761,653 B2 | 7/2010 | Lee et al. | |
| 8,332,728 B2 | 12/2012 | Cheng et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,874,825 B2 | 10/2014 | Alrod et al. | |
| 8,982,619 B2 | 3/2015 | Strasser et al. | |
| 2010/0332729 A1 * | 12/2010 | Alrod | G06F 11/1068 711/103 |
| 2011/0233648 A1 | 9/2011 | Seol et al. | |
| 2014/0156812 A1 | 6/2014 | Deng et al. | |
| 2014/0281119 A1 | 9/2014 | Hyun et al. | |
| 2014/0281769 A1 * | 9/2014 | Ohshima | G11C 29/42 714/721 |
| 2015/0194196 A1 * | 7/2015 | Huang | G11C 7/1072 711/105 |

* cited by examiner

*Primary Examiner* — Han Yang
(74) *Attorney, Agent, or Firm* — Harness, Dickey & Pierce, P.L.C.

(57) ABSTRACT

A semiconductor device includes a memory cell array including a first memory region and a second memory region; a plurality of register sets for storing a plurality of parameter sets; and a control logic circuit configured to, activate a first register set among the plurality of register sets in response to a selection signal, and perform an access operation on the first memory region using a parameter set stored in an activated register set from among the plurality of register sets.

20 Claims, 14 Drawing Sheets

FIG. 3

| PARAMETERS1 | Para_RV1 | Para_PV1 | ••• | ~ 343-1 |
|---|---|---|---|---|
| PARAMETERS2 | Para_RV2 | Para_PV2 | ••• | ~ 343-2 |
| ⋮ | ⋮ | ⋮ | ••• | |
| PARAMETERSn | Para_RVn | Para_PVn | ••• | ~ 343-n |

FIG. 5

TABLE1

| Signal | Value | | | |
|---|---|---|---|---|
| | Para_RV1 | Para_RV2 | ••• | Para_RVn |
| Selected WL | 0 | 0 | ••• | 0 |
| Unselected WL | Vread1 | Vread2 | ••• | Vreadn |
| Selected BL | Vb1 | Vb2 | ••• | Vbn |
| Unselected BL | 0 | 0 | ••• | 0 |
| SSL | Vread1 | Vread2 | ••• | Vreadn |
| GSL | Vread1 | Vread2 | ••• | Vreadn |
| CSL | 0 | 0 | ••• | 0 |
| BULK | 0 | 0 | ••• | 0 |
| | 343-1 | 343-2 | | 343-n |

FIG. 6

TABLE2

| Signal | Value | | | |
|---|---|---|---|---|
| | Para_PV1 | Para_PV2 | ••• | Para_PVn |
| Selected WL | Vpgm1 | Vpgm2 | ••• | Vpgmn |
| Unselected WL | Vpass1 | Vpass2 | ••• | Vpassn |
| Selected BL | 0 | 0 | ••• | 0 |
| Unselected BL | Vcc | Vcc | ••• | Vcc |
| SSL | Vcc | Vcc | ••• | Vcc |
| GSL | 0 | 0 | ••• | 0 |
| CSL | Vcs1 | Vcs2 | ••• | Vcsn |
| BULK | 0 | 0 | ••• | 0 |
| | 343-1 | 343-2 | | 343-n |

FIG. 7

CMD : | CMD Arguments | SLB |

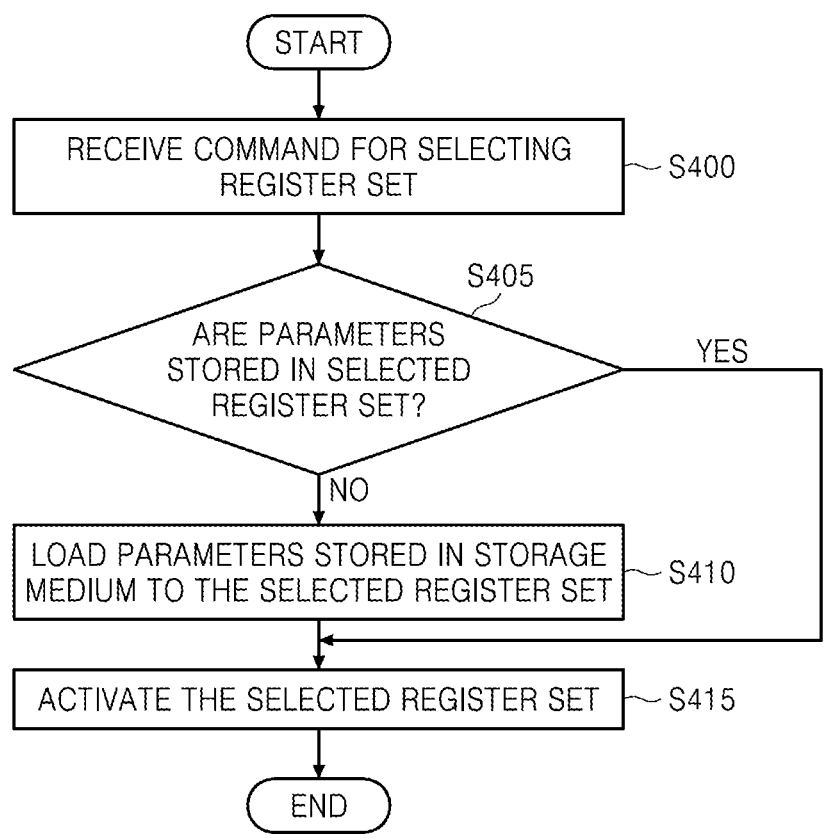

SEMICONDUCTOR DEVICE HAVING REGISTER SETS AND DATA PROCESSING DEVICE INCLUDING THE SAME

CROSS-REFERENCE TO RELATED APPLICATION

This application claims priority under 35 U.S.C. § 119(a) from Korean Patent Application No. 10-2015-0148818 filed on Oct. 26, 2015, the entire contents of which are incorporated herein by reference.

BACKGROUND

1. Field

At least some example embodiments of the inventive concepts relate to a semiconductor device, and more particularly, to a semiconductor device having register sets each for storing each of parameter sets and a data storage device including the same.

2. Related Art

When a write operation or a read operation is performed on a data storage device, it may be desirable for the data storage device to operate in accordance with a specification required.

The data storage device includes registers for storing parameters required for a write operation or a read operation. Accordingly, the data storage device performs the write operation or the read operation using the parameters stored in the registers.

It may be desirable to change at least some of the parameters stored in the registers. At this time, when a controller for controlling the data storage device transmits each of change commands for each of the parameters to be changed to the data storage device, the data storage device sets each of the parameters in each of registers in response to each of the change commands.

SUMMARY

According to at least some example embodiments of the inventive concepts, a semiconductor device includes a memory cell array including a first memory region and a second memory region; a plurality of register sets for storing a plurality of parameter sets; and a control logic circuit configured to, activate a first register set among the plurality of register sets in response to a selection signal, and perform an access operation on the first memory region using a parameter set stored in an activated register set from among the plurality of register sets.

Each of the parameter sets may include a plurality of parameters related to at least one of a write command, a read command, or an erase command.

The plurality of parameter sets may be stored in the second memory, and the control logic circuit may be configured to load the plurality of parameter sets stored in the second memory region to the plurality of register sets.

The control logic circuit may be configured to load the plurality of parameter sets from the second memory region to the plurality of register sets when the semiconductor device is booted or initiated.

The control logic circuit may be configured to receive the plurality of parameter sets from a controller and store the plurality of parameter sets in the plurality of register sets.

The control logic circuit may be configured to store the plurality of parameter sets stored in the plurality of register sets in the second memory region.

The control logic circuit may be configured to, receive a command and the plurality of parameter sets from a controller, and store the plurality of parameter sets in the plurality of register sets in response to the command.

The control logic circuit may be configured to select and activate the first register set based on a command including the selection signal.

The semiconductor device may be a NAND-type flash memory device, the memory cell array may include a plurality of memory cells, and each of the plurality of memory cells may be a three-dimensional memory cell.

According to at least some example embodiments of the inventive concepts, a data storage device includes a semiconductor device; and a controller for controlling the semiconductor device, wherein the semiconductor device includes, a memory cell array including a first memory region and a second memory region, a plurality of register sets for storing a plurality of parameter sets, and a control logic circuit configured to, activate a first register set among the plurality of register sets in response to a selection signal output from the controller, and access the first memory region based on a first command output from the controller and a parameter set stored in an activated register set from among the plurality of register sets.

The control logic circuit may be configured to load the plurality of parameter sets stored in the second memory region to the plurality of register sets when the data storage device is booted or initiated.

The controller may be configured to generate the plurality of parameter sets, and the control logic circuit may be configured to receive the plurality of parameter sets from the controller and store the plurality of parameter sets in the plurality of register sets.

The controller may be configured to generate the selection signal based on at least one of a frequency of access to the first memory region or characteristics of the first memory region.

The characteristics of the first memory region may include a state or an operating temperature of each of memory cells included in the first memory region, and the frequency of access may include a number of write operations or a number of read operations on the first memory region.

The selection signal may be included in the first command or included in a second command that is different from the first command.

According to at least some example embodiments of the inventive concepts, a semiconductor device includes a memory cell array; a plurality of register sets; and a control logic circuit configured to, load a plurality of parameter sets into the plurality of register sets; select a first register set among the plurality of register sets based on a selection signal, the selection signal including information indicating the first register set, and perform an access operation on the memory cell array using a parameter set stored in the selected first register set from among the plurality of register sets.

The control logic may be configured to receive a command, and the command includes the selection signal.

The memory cell array may include a first memory region and a second memory region, the second memory region being separate from the first memory region, the control logic circuit may be configured to load the plurality of parameter sets from the second memory region into the plurality of register sets, and the control logic circuit may be configured to perform the access operation on the first memory region.

According to at least some example embodiments of the inventive concepts, a data storage device may include the semiconductor device of claim; and a controller for controlling the semiconductor device.

The controller may be configured to generate the plurality of parameter sets, and the control logic circuit may be configured to receive the plurality of parameter sets from the controller.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 3 shows a parameter set stored in each register set According to at least one example embodiment of the inventive concepts;

FIG. 5 shows parameter sets According to at least one example embodiment of the inventive concepts, which are used in a read operation;

FIG. 6 shows parameter sets According to at least one example embodiment of the inventive concepts, which are used in a write operation;

FIG. 7 shows the format of a command According to at least one example embodiment of the inventive concepts, which includes a selection signal.

FIG. 12 is a flowchart which describes the operation of the data processing system shown in FIG. 1;

DETAILED DESCRIPTION OF THE EMBODIMENTS

Figure 1:
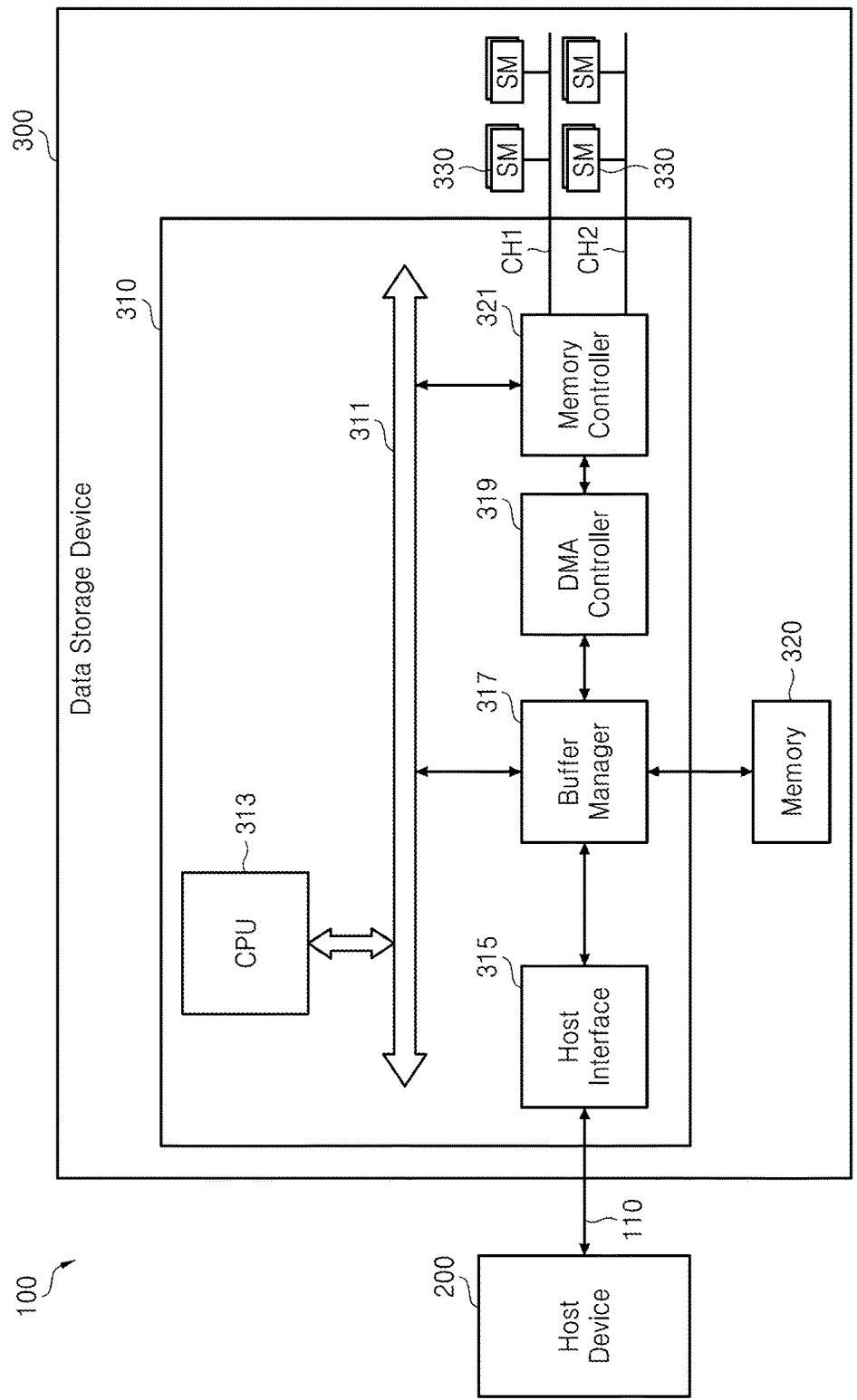
FIG. 1 shows a block diagram of a data processing system according to at least some example embodiments of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", an and the are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

A semiconductor device (or a storage medium) according to at least some example embodiments of the inventive concepts may include a plurality of register sets (333-1 to 333-n of FIG. 2), and each register set may include a plurality of registers. Each register set may store a plurality of parameters in advance. The plurality of parameters stored in advance may include DC and AC characteristics, e.g., operating voltages and/or operating currents, required for an access operation (for example, a write operation, a read operation, or an erase operation). Though, for the purpose of simplicity, the plurality of parameters stored in advance are described herein with reference to an example where the plurality of parameters stored in advance are operating voltages, at least some example embodiments of the inventive concepts are not limited thereto, and the plurality of parameters stored in advance may be or include values other than operating voltages.

A selection signal for selecting one of a plurality of register sets (333-1 to 333-n of FIG. 2) may be an independent command, or may be included in a write command, a read command, or an erase command. In addition, each of parameter sets to be stored in each of the plurality of register sets (333-1 to 333-n of FIG. 2) may be transmitted from a storage medium controller and may be loaded from a storage medium.

FIG. 1 shows a block diagram of a data processing system according to at least some example embodiments of the inventive concepts. Referring to FIG. 1, a data processing system 100 may include a host device 200 and a data storage device 300 capable of transmitting signals to or receiving signals from the host device 200 through an interface 110.

The data processing system 100 may be embodied as, for example, a personal computer (PC), a workstation, a data center, an internet data center (IDC), a direct attached storage (DAS), a storage area network (SAN), a network attached storage (NAS), or a mobile device; however, the data processing system 100 is not limited to the above-referenced examples. Examples of the mobile device include, but are not limited to, a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an Internet of Things (IoT) device, an Internet of Everything (IoE) device, a drone, and an e-book.

According to at least some example embodiments of the inventive concepts, examples of the interface 110 include, but are not limited to, a serial advanced technology attachment (SATA) interface, a SATA express (SATAe) interface, a serial attached small computer system interface (SCSI) interface, a peripheral component interconnect express (PCIe) interface, a non-volatile memory Express (NVMe) interface, an advanced host controller interface (AHCI) interface, and a multimedia card (MMC) interface according to at least some example embodiments of the inventive concepts, the interface 110 may transmit electrical signals or optical signals.

The host device 200 may control a data processing operation (for example, a write operation or a read operation) of the data storage device 300 through the interface 110. The host 200 may refer to a host controller. According to at least some example embodiments of the inventive concepts, examples of the host device 200 include, but are not limited to, an integrated circuit (IC), a motherboard, a system on chip (SoC), an application processor (AP), a mobile AP, a web server, a data server, and a database server.

The data storage device 300 may include a storage medium controller 310, a first memory 320, and a plurality of second memories 330. Each of the plurality of second memories 330 may refer to a storage medium.

According to at least some example embodiments of the inventive concepts, the data storage device 300 may be a flash-based storage; however, the data storage device 300 is not limited to this example. Examples of the data storage device 300 include, but are not limited to, a solid-state drive or solid-state disk (SSD), an embedded SSD (eSSD), a universal flash storage (UFS), a multimedia card (MMC), an embedded MMC (eMMC), or a managed NAND. For example, the flash-based storage may be embodied in a NAND-type flash memory device or a NOR-type flash memory device.

According to at least some example embodiments of the inventive concepts, additional examples of the data storage device 300 include, but are not limited to, a hard disk drive (HDD), a phase change RAM (PRAM) device, a magnetoresistive RAM (MRAM) device, a spin-transfer torque MRAM (STT-MRAM) device, a ferroelectric RAM (FRAM) device, or a resistive RAM (RRAM) device.

According to at least some example embodiments, of the inventive concepts, the storage medium controller 310 may control data transmitted or received among the host device 200, the first memory 320, and the plurality of second memories 330.

The storage medium controller 310 may include, for example, a bus 311, a central processing unit (CPU) 313, a host interface 315, a buffer manager 317, a direct memory access (DMA) controller 319, and a memory controller 321.

The CPU 313, the buffer manager 317, and the memory controller 321 may communicate with each other through the bus 311. The CPU 313 may control the operation of each of the components 315, 317, 319 and 321 each of which may be embodied as, for example, circuits or circuitry. According to at least some example embodiments, the data storage device 300 may include storage for storing computer-readable code (e.g., software/firmware) including instructions, the CPU 313 may read the computer-readable code, and the CPU 313 may execute the computer-readable code to perform operations in accordance with the instructions. According to at least some example embodiments, the computer-readable code may include instructions for causing the CPU 313 to perform and/or control any or all operations described herein as being performed by the data storage device 300 (or an element thereof). Processors executing computer-readable code are programmed processors, and thus, are special-purpose computers. The CPU 313 may include one or more cores. The cores may share the same semiconductor substrate or may be embodied in separate semiconductor chips.

According to at least some example embodiments, the CPU 313 may be one of multiple CPUs of a multiprocessor system included in the data storage device 300, and the operations described herein as being performed by the CPU 31 may be performed by the multiprocessor system.

The host interface 315 may change the protocol of signals transmitted or received between the interface 110 and the buffer manager 317.

Accordingly, to at least some example embodiments, buffer manager 317 may be a circuit or circuitry that writes data in the first memory 320 or read data from the first memory 320 according to a control of the CPU 313. The buffer manager 317 may be referred to as a buffer controller which can control a write operation and a read operation on the first memory 320.

The buffer manager 317 and the memory controller 321 may transmit or receive data through the DMA controller 319. For example, the DMA controller 319 may read data from the buffer manager 317, transmit read data to the memory controller 321, and transmit data transmitted from the memory controller 321 to the buffer manager 317.

The memory controller 321 may control a data processing operation (for example, a write operation, a read operation, or an erase operation) of the storage mediums 330 connected to each of channels CH1 and CH2 according to a control of the CPU 313 or the DMA controller 319.

According to at least some example embodiments of the inventive concepts, the memory controller 321 may be embodied as a SATA interface, a SATAe interface, a SAS interface, a PCIe interface, a NVMe interface, an AHCI interface, an MMC interface, a NAND-type flash memory interface, or a NOR-type flash memory interface; however, the memory controller 321 is not limited to the above-referenced examples. When the storage mediums 330 are NAND-type flash memory devices, the memory controller 321 may be embodied as a flash memory controller (FMC). Each of the storage mediums 330 may refer to a semiconductor device and/or a memory device.

The first memory 320 may store or output data according to a control of the buffer manager 317. According to at least some example embodiments of the inventive concepts, examples of the first memory 320 include, but are not limited to, a buffer memory, a random access memory (RAM), a static RAM (SRAM), or a dynamic RAM (DRAM).

The first memory 320 may include a first region for storing a mapping table used for logical address physical address conversion (e.g., converting logical addresses to physical addresses) in the storage mediums 330 and a second region serving as a cache; however, the first memory 320 is not limited to the above-referenced examples. For example, a flash translation layer (FTL) performed (e.g., executed and/or implemented) by the CPU 313 may perform the logical address-physical address conversion using the mapping table stored in the first region.

According to at least one example embodiment of the inventive concepts, when each of the storage medium controller 310 and the first memory 320 is embodied in a different semiconductor chip or a semiconductor package, the storage medium controller 310 and the first memory 320 may be embodied as one package, e.g., a package-on-package (PoP), a multi-chip package (MCP), or a system-in package (SiP); however, it is not limited thereto.

The storage mediums 330 may be embodied as volatile memories, e.g., NAND-type flash memories. A first group of storage mediums may be connected to a first channel CH1, and a second group of storage mediums may be connected to a second channel CH2.

A "channel" herein may refer to an independent data path present between the memory controller 321 and each group of storage mediums. The data path may include transmission lines for transmitting data and/or control signals. A "way" may refer to a group of one or more storage mediums sharing a corresponding channel.

Figure 2:
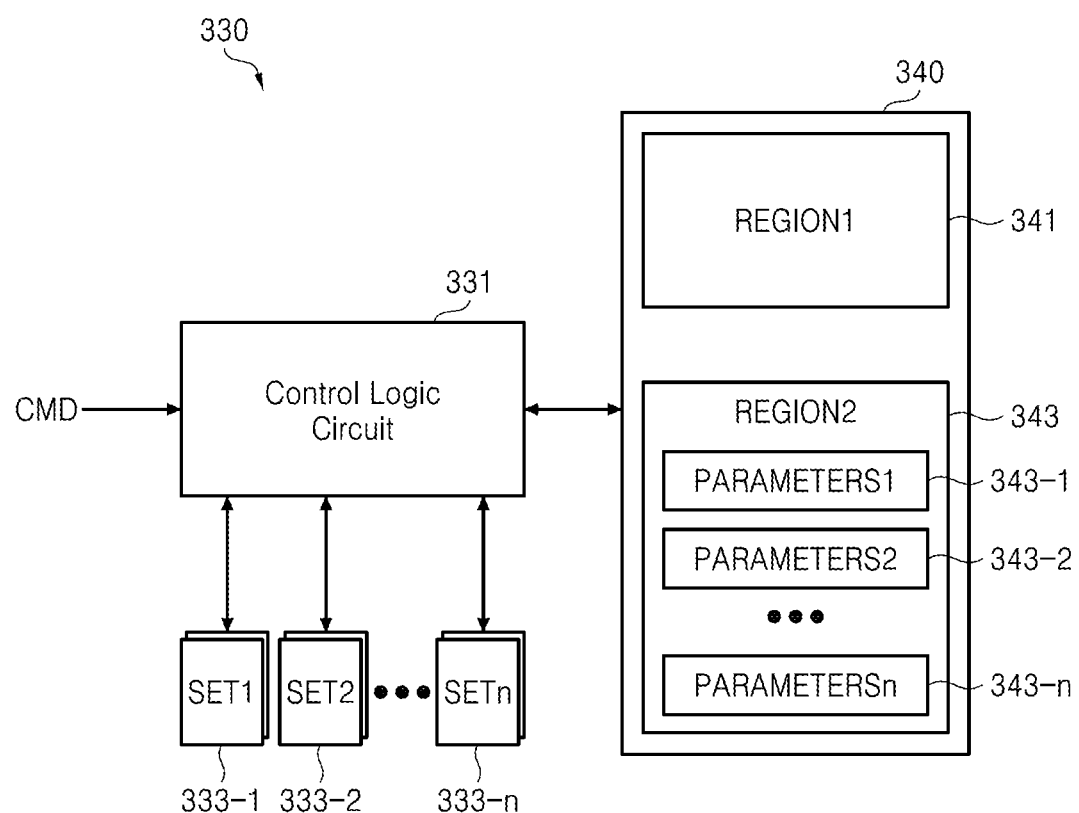
FIG. 2 shows a block diagram of a storage medium shown in FIG. 1.

FIG. 2 shows a block diagram of a storage medium shown in FIG. 1. Referring to FIGS. 1 and 2, the storage medium 330, e.g., NAND-type flash memory, may include a control logic circuit 331, a plurality of register sets 333-1 to 333-$n$, and a memory cell array 340.

The control logic circuit 331 may selectively activate one of the register sets 333-1 to 333-$n$ in response to a selection signal, and perform an access operation on the first memory region 341 using a parameter set stored in an activated (or selected) register set. For example, activating a register set may include using a parameter set stored in the register set to perform a data access (e.g., read/write) operation.

The control logic circuit 331 may control, for example, a write operation, a read operation, or an erase operation on the memory cell array 340. Moreover, the control logic circuit 331 may perform an operation of writing each parameter set transmitted from the memory controller 321 or the second memory region 343 in each of the register sets 333-1 to 333-$n$, and an operation of writing (or injecting) each parameter set stored in each of the register sets 333-1 to 333-$n$ in the second memory region 343.

Each of the register sets 333-1 to 333-$n$ may include a plurality of registers and may store each of parameter sets.

According to at least some example embodiments of the inventive concepts, the control logic circuit 331 may load each of parameter sets 343-1 to 343-$n$ stored in the second memory region 343 to each of the register sets 333-1 to 333-$n$. More specifically, the control logic circuit 331 may load each of the parameter sets 343-1 to 343-$n$ stored in the second memory region 343 to each of the register sets 333-1 to 333-$n$ when the storage medium 330 is booted or initiated.

First parameter sets PARAMETERS1 or 343-1 may be loaded to a first register set 333-1, second parameter sets PARAMETERS2 or 343-2 may be loaded to a second register set 333-2, $n^{th}$ parameter sets PARAMETERSn or 343-$n$ may be loaded to an $n^{th}$ register set 333-$n$. For example, the first parameter sets PARAMETERS1 or 343-1 may include parameters (or parameter values) related to a first command, the second parameter sets PARAMETERS2 or 343-2 may include parameters (or parameter values) related to a second command, the $n^{th}$ parameter sets PARAMETERSn or 343-$n$ may include parameters (or parameter values) related to an $n^{th}$ command. Each command may refer to, for example, a write command, a read command, or an erase command; however, it is not limited thereto.

According to at least some example embodiments of the inventive concepts, the control logic circuit 331 may receive each of parameter sets from the memory controller 321 and store the parameter sets in each of the register sets 333-1 to 333-$n$. According to at least some example embodiments, each register set may store a parameter set. Then, the control logic circuit 331 may store each of the parameter sets stored in each of the register sets 333-1 to 333-$n$ in the second memory region 343.

For example, when testing the storage medium 330, the control logic circuit 331 may receive each of parameter sets from a test device which performs a function the same as or similar to that of the memory controller 321, and store the parameter sets in each of the register sets 333-1 to 333-n. In order to sell the storage medium 330 after a test for the storage medium 330 is completed, a manufacturer may store each of the parameter sets stored in each of the register sets 333-1 to 333-n in the second memory region 343 using the control logic circuit 331.

The control logic circuit 331 may receive a command CMD and each of parameter sets from a test device or the memory controller 321, and store each of the parameter sets in each of the register sets 333-1 to 333-n in response to the command CMD.

The control logic circuit 331 may selectively activate one of the register sets 333-1 to 333-n based on a selection signal. According to at least some example embodiments of the inventive concepts, the selection signal may be embodied as an independent dedicated command or may be included in a dedicated command.

In other words, (1) a command to perform an operation of writing (or injecting), (2) a command to selectively activate one of the register sets 333-1 to 333-n, and/or (3) a command to store each of parameter sets output from a test device or the memory controller 321 in each of the register sets 333-1 to 333-n may be embodied as a dedicated command.

The memory cell array 340 may include the first memory region 341 and the second memory region 343. For convenience of description, it is assumed that the first memory region 341 may store user data or metadata and the second memory region 343 may store a plurality of parameter sets 343-1 to 343-n, where n is a natural number of three or more.

The memory cell array 340 may be embodied in, for example, a two-dimensional or three-dimensional memory cell array. According to at least one example embodiment of the inventive concepts, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

According to at least one example embodiment of the inventive concepts, the 3D memory array includes vertical NAND strings that are vertically oriented such that at least one memory cell is located over another memory cell. The at least one memory cell may comprise a charge trap layer. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

FIG. 3 shows a parameter set stored in each register set According to at least one example embodiment of the inventive concepts, FIG. 5 shows parameter sets according to at least one example embodiment of the inventive concepts, which are used in a read operation, and FIG. 6 shows parameter sets according to at least one example embodiment of the inventive concepts, which are used in a write operation.

Referring to the examples shown in FIGS. 2, 3, 5, and 6, it is assumed that the first parameter set PARAMETERS1 or 343-1 may include a first read parameter set Para_RV1 and a first write parameter set Para_PV1, the second parameter set PARAMETERS2 or 343-2 may include a second read parameter set Para_RV2 and a second write parameter set Para_PV2, and the $n^{th}$ parameter set PARAMETERSn or 343-n includes an $n^{th}$ read parameter set Para_RVn and an $n^{th}$ write parameter set Para_PVn.

Figure 4:
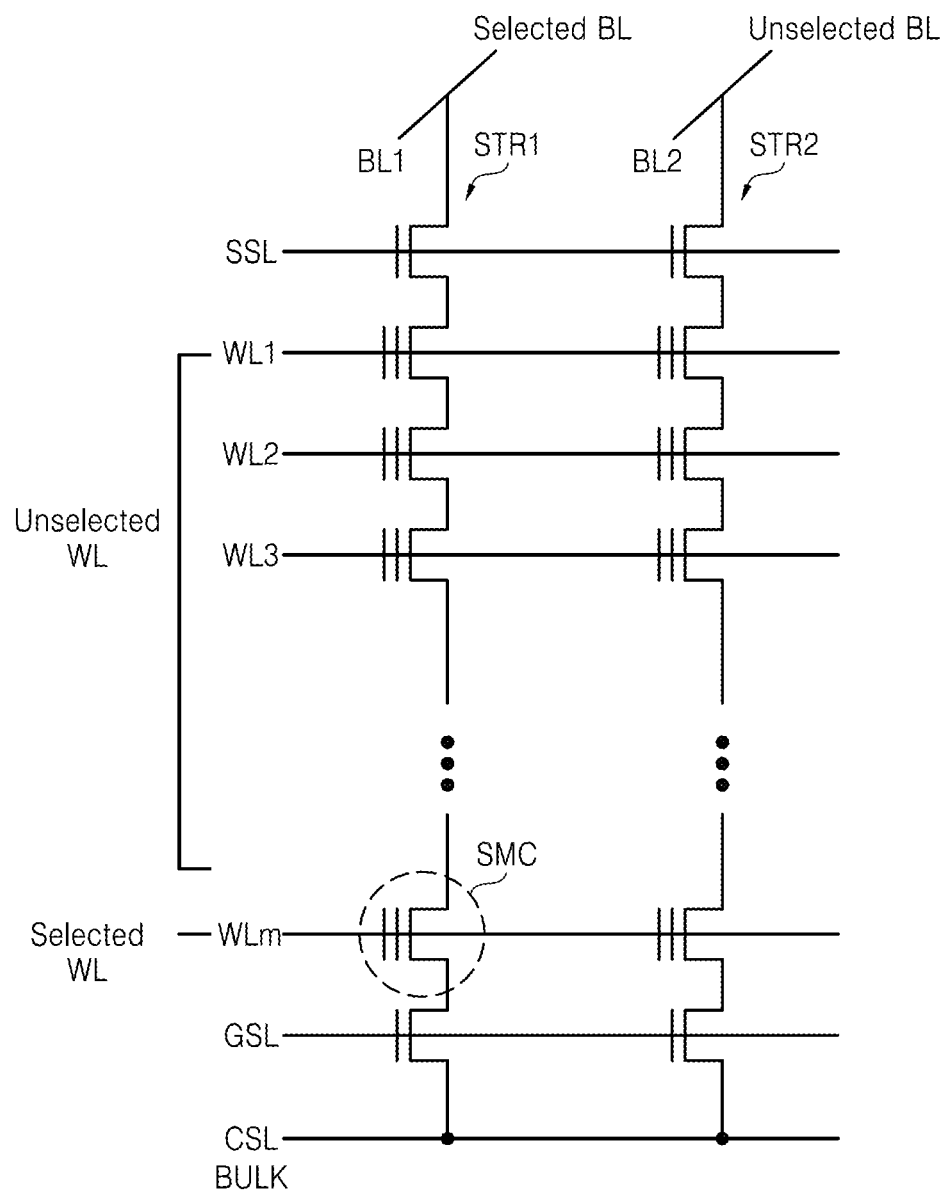
FIG. 4 shows NAND flash memory cells included in a memory cell array shown in FIG. 2.

FIG. 4 shows NAND flash memory cells included in the memory cell array shown in FIG. 2 (e.g., the memory cell array 340). For convenience of description, two NAND array strings STR1 and STR2 are shown in FIG. 4.

A first string STR1 may include a first string selection transistor connected to a first bit line BL1 and first flash memory cells serially connected between the first string selection transistor and a first ground selection transistor. The gate of the first string selection transistor is connected to a string select line (SSL), the gate of the first ground selection transistor is connected to a ground select line (GSL), and the first ground selection transistor is connected between an $m^{th}$ flash memory cell and a common source line (CSL).

A second string STR2 may include a second string selection transistor connected to a second bit line BL2 and second flash memory cells serially connected between the second string selection transistor and a second ground selection transistor. The gate of the second string selection transistor is connected to the SSL, the gate of the first ground selection transistor is connected to the GSL, and the first ground selection transistor is connected between the $m^{th}$ flash memory cell and the CSL.

In the example shown in FIG. 4, it is assumed that the first bit line BL1 is a selected bit line, the second bit line BL2 is an unselected bit line, word lines WL1 to WLm−1 are unselected word lines, a word line WLm is a selected word line, a flash memory cell SMC is a selected flash memory cell, and a bulk BULK is a bulk including the first string STR1 and the second string STR2.

Each of the read parameter sets Para_RV1, Para_RV2, . . . , and Para_RVn in each of the parameter sets 343-1 to 343-n is, for example, as shown in the first table TABLE1 of FIG. 5. It is assumed that Vread1 refers to a first read voltage, Vread2 refers to a second read voltage, Vreadn refers to an $n^{th}$ read voltage, Vb1 refers to a first bit line voltage supplied to a selected bit line, Vb2 refers to a second bit line voltage supplied to the selected bit line, and Vbn refers to an $n^{th}$ bit line voltage supplied to the selected bit line.

Moreover, each of the write parameter sets Para_PV1, Para_PV2, . . . , and Para_PVn in each of the parameter sets 343-1 to 343-n is, for example, as shown in the second table TABLE2 of FIG. 6.

In the example shown in FIG. 6, it is assumed that Vpgm1 refers to a first write voltage (or a program voltage), Vpgm2 refers to a second write voltage, Vpgmn refers to an $n^{th}$ write voltage, Vpass1 refers to a first pass voltage, Vpass2 refers to a second pass voltage, Vpassm refers to an $m^{th}$ pass voltage, Vcc refers to a voltage supplied to a unselected bit line and the SSL, Vcs1 refers to a first CSL voltage supplied to the CSL, Vcs2 refers to a second CSL voltage supplied to the CSL, and Vcsn refers to an $n^{th}$ CSL voltage supplied to the CSL.

Voltages shown in each of the first table TABLE1 and the second table TABLE2 are voltages for convenience of description; however, at least some example embodiments of the inventive concepts are not limited thereto. For example, other values (e.g., currents) may be included in tables TABLE1 and TABLE2. Moreover, voltages for an erase operation are not described herein, but the voltage for an erase operation can be deduced from the first table TABLE1 and/or the second table TABLE2.

FIG. 7 shows a command format according to at least one example embodiment of the inventive concepts, which includes a selection signal. Referring to FIGS. 2 and 7, a command CMD may include command arguments CMD Arguments and a selection signal SLB. The command arguments CMD Arguments may include bits which indicate whether a command CMD is a write command, a read command, or an erase command, and the selection signal SLB may include bits for selectively activating one of the plurality of register sets 333-1 to 333-n. For example, when the number of the plurality of register sets 333-1 to 333-n is four, the bits may be embodied in two-bits. According to at least some example embodiments of the inventive concepts, one of the plurality of register sets 333-1 to 333-n may store parameters set as default.

The command CMD shown in FIG. 7 may be a dedicated command for selectively activating one of the plurality of register sets 333-1 to 333-n.

If the selection signal SLB is added to a conventional command, the control logic circuit 331 may selectively activate one of the plurality of register sets 333-1 to 333-n according to a selection signal SLB included in the command when performing a write operation, a read operation, or an erase operation on the first memory region 341 according to the command. Accordingly, the control logic circuit 331 may perform the write operation, the read operation, or the erase operation on the first memory region 341 using the command and parameters stored in a selectively activated register set.

Figure 8:
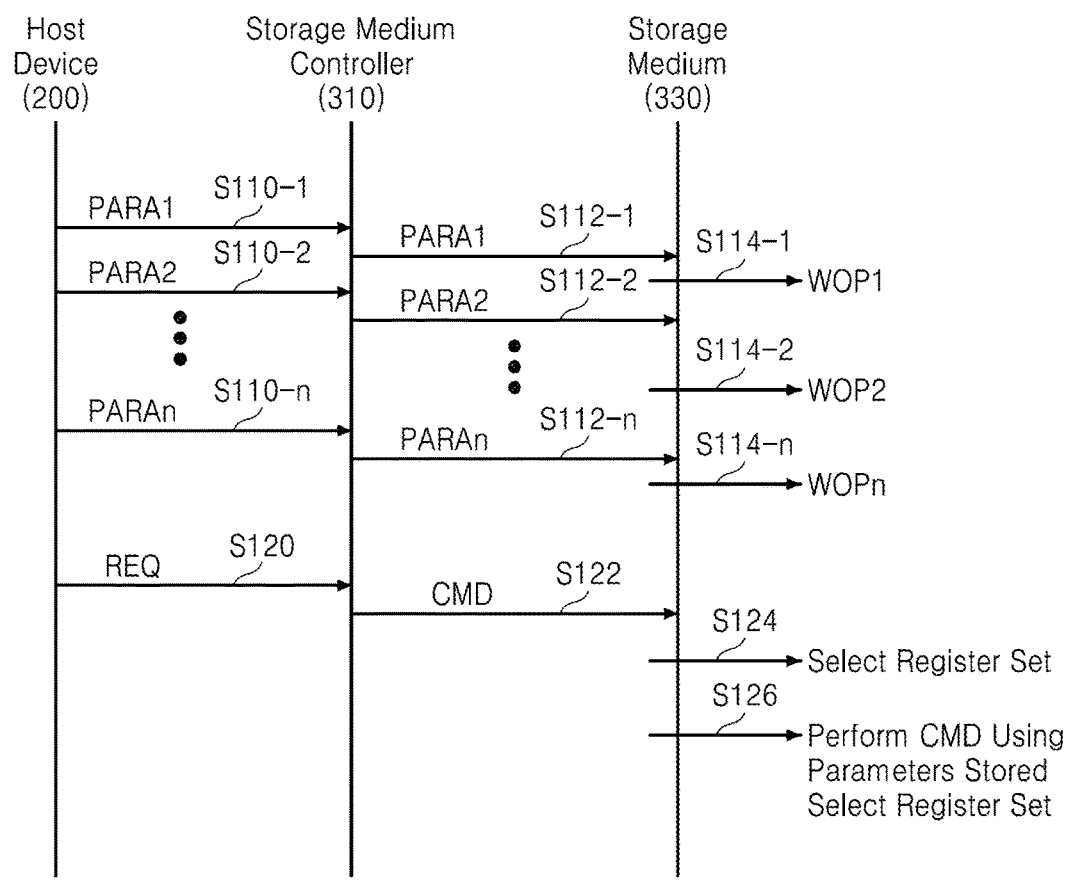
FIG. 8 is a data flow which describes the operation of the data processing system shown in FIG. 1.

FIG. 8 is a data flow which describes an operation of the data processing system shown in FIG. 1. Referring to FIGS. 1 to 8, the host device 200 may transmit the first parameter set PARAMETERS1 (simply, PARA1) and a write request related to the storage (or storing) of the first parameter set PARA1 to the storage medium controller 310 (S110-1). The storage medium controller 310 may interpret (or analyze) the write request, and transmit the first parameter set PARA1 and a command related to the write request to the storage medium 330 (S112-1). The control logic circuit 331 may perform an operation WOP1 of writing the first parameter set PARA1 in the first register set 333-1 based on the command (S114-1).

The host device 200 may transmit the second parameter set PARAMETERS2 (simply, PARA2) and a write request related to the storage (or storing) of the second parameter set PARA2 to the storage medium controller 310 (S110-2). The storage medium controller 310 may interpret (or analyze) the write request and transmit the second parameter set PARA2 and a command related to the write request to the storage medium 330 (S112-2). The control logic circuit 331 may perform an operation WOP2 of writing the second parameter set PARA2 in the second register set 333-2 based on the command (S114-2).

The host device 200 may transmit the $n^{th}$ parameter set PARAMETERSn (simply, PARAn) and a write request related to the storage (storing) of the $n^{th}$ parameter set PARAn to the storage medium controller 310 (S110-n). The storage medium controller 310 may interpret (or analyze) the write request and transmit the $n^{th}$ parameter set PARAn and a command related to the write request to the storage medium 330 (S112-n). The control logic circuit 331 may perform an operation WOPn of writing the $n^{th}$ parameter set PARAn in the $n^{th}$ register set 333-n based on the command (S114-n). As described above, the host device 200 may refer to a test device.

The host device 200 may transmit a request REQ to the storage medium controller 310 (S120). The request REQ may be, for example, a write request for a write operation, a read request for a read operation, or an erase request for an erase operation. As shown in FIG. 7, the request REQ may include a selection signal.

The CPU 313 of the storage medium controller 310 may interpret (or analyze) a request REQ and transmit a command CMD including a selection signal SLB to the storage medium 330 (S122). The control logic circuit 331 selectively activates one of the plurality of register sets 333-1 to 333-n using the selection signal SLB (S124).

The control logic circuit 331 may perform an access operation on the first memory region 341 based on parameters stored in a selected register set and the command CMD (S126). Here, activation of a register set may refer to a state in which parameters stored in the register set (e.g., the activated register set) may be used.

For example, when the command CMD is a read command and the first parameter set 343-1 is selected or activated based on a selection signal SLB, the control logic circuit 331 may perform a read operation on the first memory region 341 using parameters (for example, 0, Vread1, and Vb1) shown in the first table TABLE1 of FIG. 5. Here, "0" refers to a ground voltage or 0V.

For example, when the command CMD is a write command and the $n^{th}$ parameter set 343-n is selected or activated based on a selection signal SLB, the control logic circuit 331 may perform a write operation on the first memory region 341 using parameters (for example, Vpgmn, Vpassn, 0, Vcc, and Vcsn) shown in the second table TABLE2 of FIG. 6.

Figure 9:
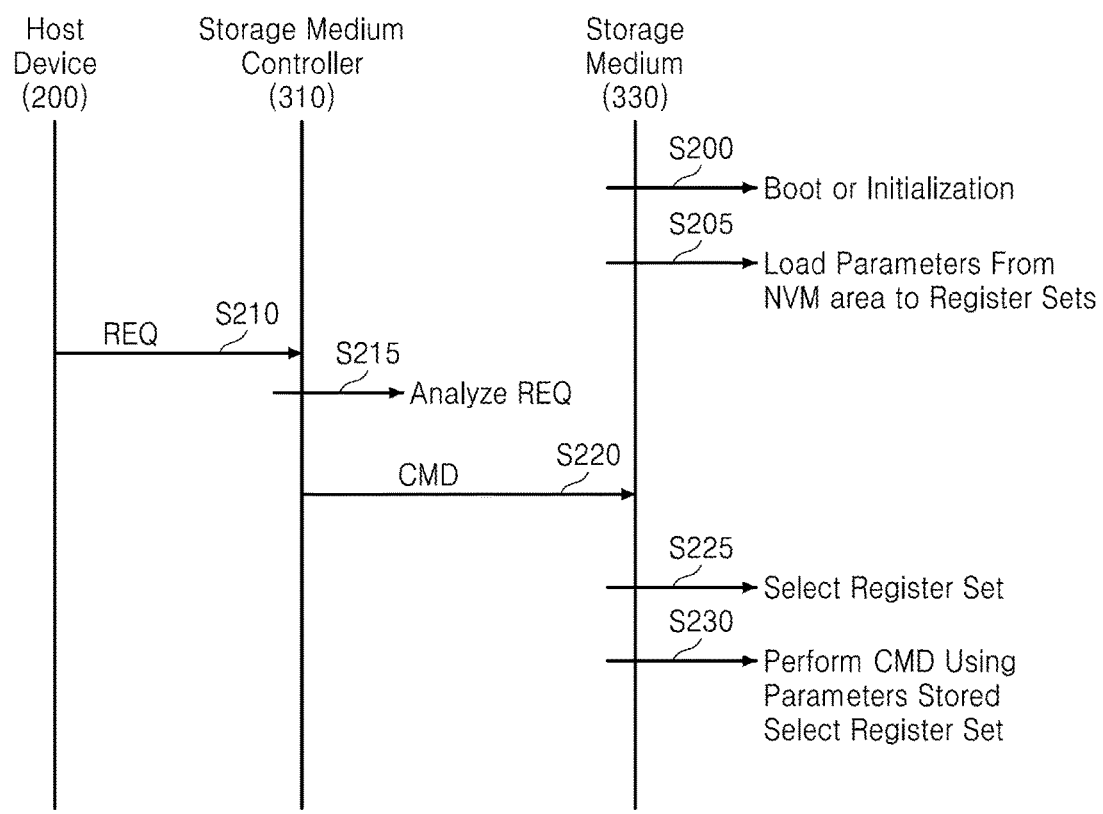
FIG. 9 is a data flow which describes the operation of the data processing system shown in FIG. 1.

FIG. 9 is a data flow which describes the operation of the data processing system shown in FIG. 1. Referring to FIGS. 1 to 9, the second memory region 343 may store the parameter sets 343-1 to 343-n. According to at least some example embodiments of the inventive concepts, after a test for the storage medium 330 is completed, each parameter set stored in each of the register sets 333-1 to 333-n may be stored or injected in the second memory region 343 according to a control of the control logic circuit 331. According to at least some example embodiments of the inventive concepts, the control logic circuit 331 may write each parameter set transmitted from the host device 200 in the second memory region 343.

When the storage medium 330 is booted or initiated (S200), the control logic circuit 331 may load each of the parameter sets 343-1 to 343-n stored in the second memory region 343 to each of the register sets 333-1 to 333-n (S205). The host device 200 may transmit a request REQ to the storage medium controller 310 (S210).

The CPU 313 of the storage medium controller 310 may interpret (or analyze) the request REQ (S215), generate a command CMD including a selection signal SLB, and transmit the command CMD to the storage medium 330 (S220). The control logic circuit 331 selectively activates one of the plurality of register sets 333-1 to 333-n using the selection signal SLB (S225).

The control logic circuit 331 may perform an access operation on the first memory region 341 based on parameters stored in a selected register set and the command CMD (S230).

Figure 10:
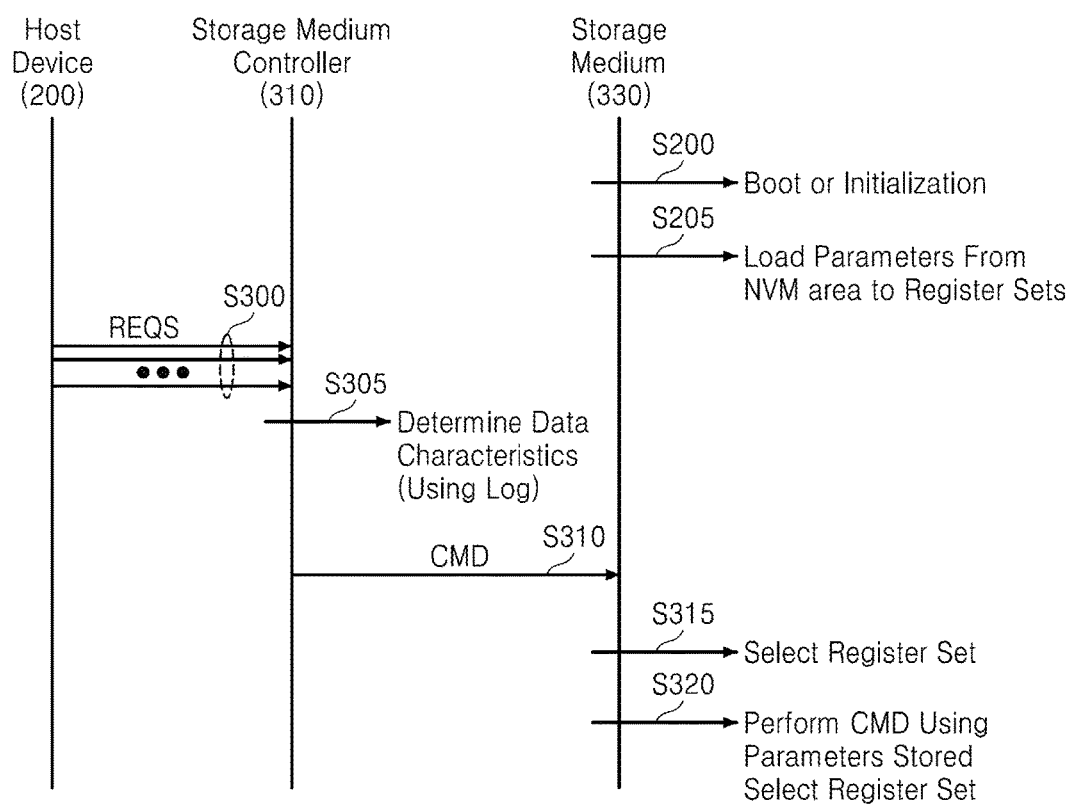
FIG. 10 is a data flow which describes the operation of the data processing system shown in FIG. 1.

FIG. 10 is a data flow which describes the operation of the data processing system shown in FIG. 1. Referring to FIGS. 1 to 10, the host device 200 may transmit a plurality of requests REQS to the storage medium controller 310 (S300). The plurality of requests REQS may include, for example, a write request, a read request, and an erase request. The plurality of requests REQS may be previous requests for determining the frequency of a write request, the frequency of a read request, and the frequency of an erase request for the second memory region 343.

The CPU 313 of the storage medium controller 310 may determine the characteristics of the first memory region 341 and the frequency of access to the first memory region 341 based on the plurality of requests REQS (S305). For example, the CPU 313 may cause requests REQ received at the storage medium controller to be stored in a log. According to at least some example embodiments, the log may be stored in memory included in the storage medium controller 310. For example, when the plurality of requests REQS are stored in a log or a log file, the CPU 313 may determine the characteristics of the first memory region 341 and the frequency of access to the first memory region 341 using the log or the log file (S305).

The CPU 313 may generate a command CMD including a selection signal SLB based on a result of the determination and transmit the command CMD to the storage medium 330 (S310). The control logic circuit 331 selectively activates one of the plurality of register sets 333-1 to 333-*n* using the selection signal SLB (S315).

The control logic circuit 331 may perform an access operation to the first memory region 341 based on parameters stored in a selected register set and the command CMD (S320).

Figure 11A:
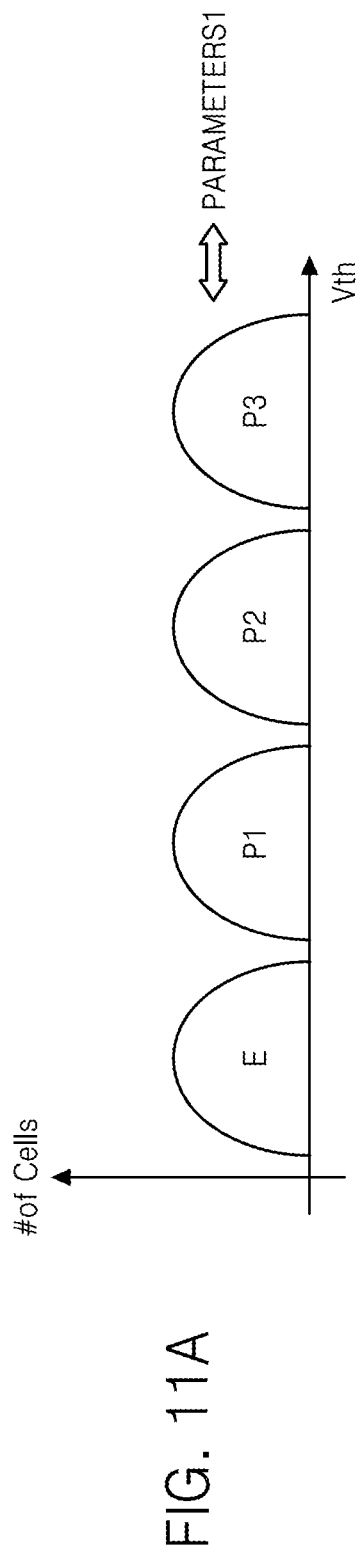
FIGS. 11A and 11B show states of memory cells shown in FIG. 2.
Figure 11B:
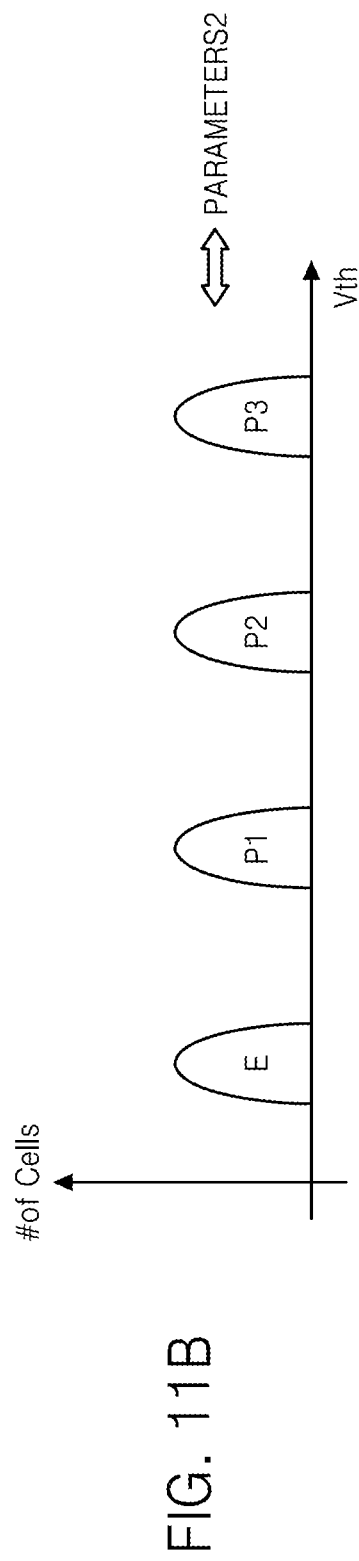

FIG. 11 shows states of memory cells shown in FIG. 2 (e.g., memory cells of the memory cell array 340). Referring to FIGS. 1, 2, 10, and 11, the CPU 313 may determine the state distribution of memory cells included in the first memory region 341 based on results of read operations and/or results of write operations on the first memory region 341 as shown in FIG. 11A. In the examples shown in FIGS. 11A and 11B, E represents an erase state, and each of P1, P2, and P3 represents a program state.

At this time, the CPU 313 may generate a selection signal SLB for selectively activating the first register set 333-1 and transmit a command CMD including the selection signal SLB to the storage medium 330. The control logic circuit 331 selectively activates the first register set 333-1 among the plurality of register sets3 333-1 to 333-*n* using the selection signal SLB.

The control logic circuit 331 may perform an access operation on the first memory region 341 based on the parameter sets PARAMETERS1 stored in the first register set 333-1 and the command CMD.

When the CPU 313 determines the state distribution of memory cells included in the first memory region 341 based on results of the read operations and/or results of the write operations on the first memory region 341 as shown in FIG. 11B, the CPU 313 may generate a selection signal SLB for selectively activating the second register set 333-2 and transmit a command CMD including the selection signal SLB to the storage medium 330. For example, the control logic circuit 331 may selectively activate the second register set 333-2 among the plurality of register sets 333-1 to 333-*n* using the selection signal SLB.

The control logic circuit 331 may perform an access operation on the first memory region 341 based on the parameter sets PARAMETERS2 stored in the second register set 333-2 and the command CMD.

FIG. 12 is a flowchart which describes the operation of the data processing system shown in FIG. 1. Referring to FIGS. 1 to 7, and 12, the control logic circuit 331 may receive a command CMD to select one register set (e.g., 333-2) (S400). The control logic circuit 331 may determine whether parameters are stored in the register set (e.g., 333-2) corresponding to the command CMD (S405).

When parameters are stored in the register set (e.g., 333-2) corresponding to the command CMD (YES of S405), the control logic circuit 331 activates the register set (e.g., 333-2) corresponding to the command CMD (S415).

However, when parameters are not stored in the register set (e.g., 333-2) corresponding to the command CMD (No of S405), the control logic circuit 331 may read the parameter set 343-2 stored in the second memory region 343 and load the read parameter set 343-2 to the register set (e.g., 333-2) (S410). The control logic circuit 331 activates the register set (e.g., 333-2) corresponding to the command CMD (S415).

The control logic circuit 331 may receive a command (e.g., a write command, a read command, or an erase command) for the first memory region 341, and perform the command on the first region 341 using the parameter set 343-2.

Figure 13:
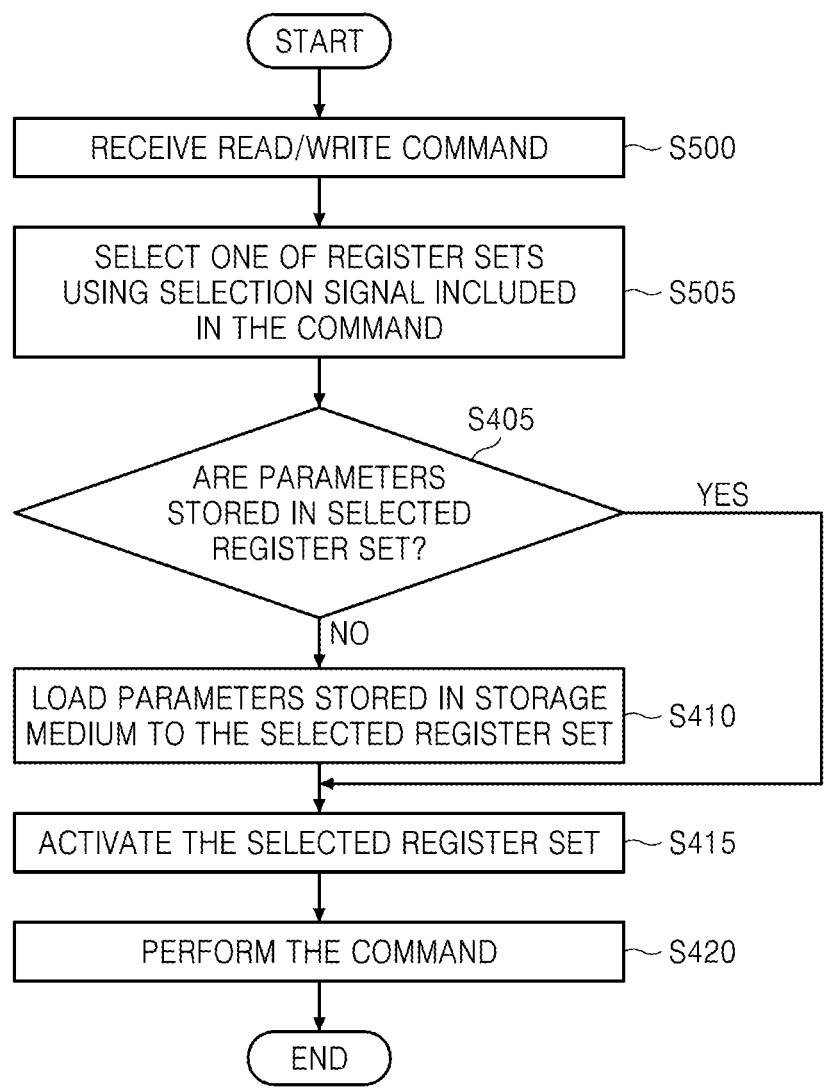
FIG. 13 is a flowchart which describes the operation of the data processing system shown in FIG. 1.

FIG. 13 is a flowchart which describes the operation of the data processing system shown in FIG. 1. Referring to FIGS. 1 to 7, and 13, the control logic circuit 331 may receive a read command or a write command CMD including a selection signal SLB (S500).

The control logic circuit 331 may select one (e.g., 333-2) of the plurality of register sets 333-1 to 333-*n* using the selection signal SLB included in the command CMD (S505).

The control logic circuit 331 may determine whether the parameters 343-2 are stored in a selected register set (e.g., 333-2) (S405). When the parameters 343-2 are stored in a register set (e.g., 333-2) corresponding to the command CMD (YES of S405), the control logic circuit 331 activates the register set (e.g., 333-2) corresponding to the command CMD (S415).

However, when the parameters 343-2 are not stored in the register set (e.g., 333-2) corresponding to the command CMD (NO of S405), the control logic circuit 331 may read the parameter set 343-2 stored in the second memory region 343, and load the read parameter set 343-2 to the register set (e.g. 333-2) (S410). The control logic circuit 331 activates the register set (e.g., 333-2) corresponding to the command CMD (S415).

The control logic circuit 331 may perform an access operation (e.g., a write operation, a read operation, or an erase operation) on the first memory region 341 based on the command CMD and the parameter set 343-2.

Figure 14:
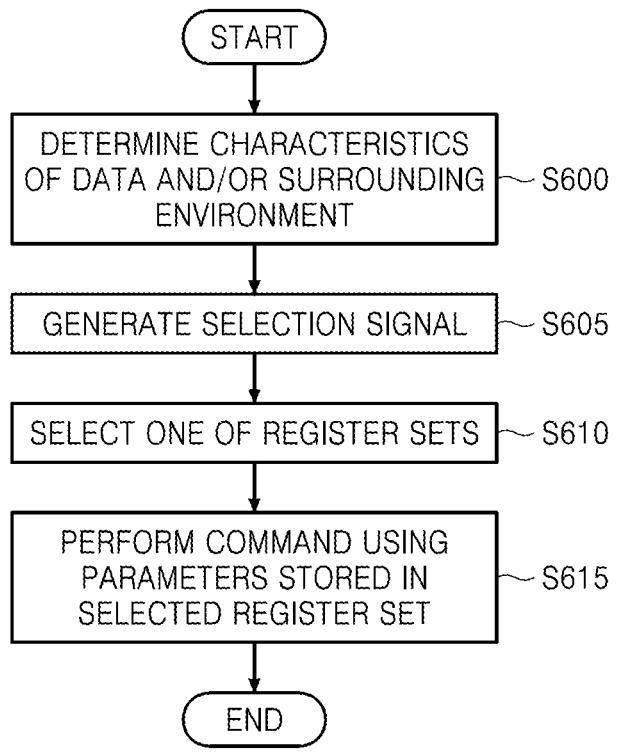
FIG. 14 is a flowchart which describes the operation of the data processing system shown in FIG. 1.

FIG. 14 is a flowchart which describes the operation of the data processing system shown in FIG. 1. Referring to FIGS. 1 to 7, and 14, the storage medium controller 310 may determine the characteristics of data that is stored (or data that is to be stored) in the memory cell array 340 and/or the surrounding environment (for example, state or an temperature (or operating temperature; the operating temperature is the temperature of a storage medium caused by an operating of the storage medium) of each of memory cells included in the first memory region) of the storage medium 330 (S600).

For example, the CPU 313 of the storage medium controller 310 may determine whether data stored in the first memory region 341 are hot data or cold data. The hot data is defined as data having a relatively high frequency of being accessed, and the cold data are defined as data having a relatively low frequency of being accessed. The CPU 313 may determine the number of write operations or program/erase (P/E) cycles on the first memory region 341.

The CPU 313 may generate a command CMD including a selection signal SLB and transmit the command CMD to the control logic circuit 331 (S605).

The control logic circuit 331 may select one of the plurality of register sets 333-1 to 333-n using the selection signal SLB included in the command CMD (S610).

The control logic circuit 331 may perform an access operation (e.g., a write operation, a read operation, or an erase operation) on the first memory region 341 using the command CMD and parameters stored in a selected register set (S615).

Figure 15:
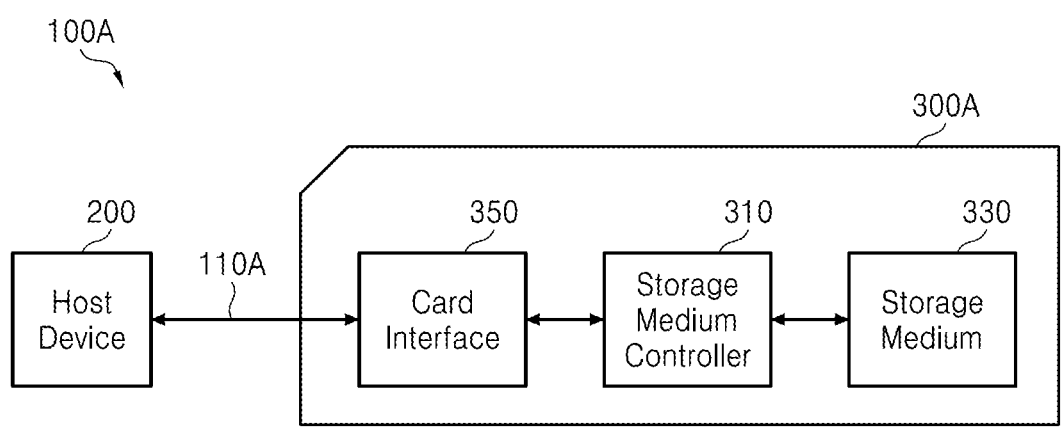
FIG. 15 shows a block diagram of the data processing system According to at least one example embodiment of the inventive concepts.

FIG. 15 shows a block diagram of the data processing system according to at least one example embodiment of the inventive concepts. Referring to FIGS. 1 and 15, a data processing system 100A may include the host device 200 and a memory card 300A which transmits or receive signals to or from each other through an interface 110A.

The interface 110A may be embodied as an MMC interface, an eMMC interface, or a UFS interface.

According to at least some example embodiments of the inventive concepts, the memory card 300A may be embodied as, for example, an MMC, an eMMC, or a UFS as a data storage device, and include a card interface 350, the storage medium controller 310, and the storage medium 330.

The card interface 350 may control the transmission of signals transmitted or received between the interface 110A and the storage medium controller 310. The storage medium controller 310 may control the transmission of signals transmitted or received between the card interface 350 and the storage medium 330. According to at least some example embodiments, with the exception that the memory card 300A does not include the first memory 320, the memory card 300A may have a structure and operation that is the same as (or, alternatively, similar to) the structure and operation of the data storage device 300. Thus, with the exception that the buffer manager 317 of the storage medium controller 310 does not perform an access to the first memory 320, the storage medium controller 310 of FIG. 15 may have a structure and operation that is the same as (or, alternatively, similar to) the structure and operation described above with respect to the storage medium controller 310 of FIG. 1.

A semiconductor device according to at least one example embodiment of the inventive concepts may include a plurality of register sets each for storing each of parameter sets set in advance. The semiconductor device may use parameters stored in one of the plurality of register sets when the parameters need to be changed to perform a write command, a read command, or an erase command. Accordingly, even if it is desirable for each of the parameters to be changed, the semiconductor device may change each of the parameters without receiving a parameter to be changed and a change command generated per the parameter to be changed from a controller. The controller may not transmit a change command per parameter to be changed to a semiconductor device.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A semiconductor device comprising:
   a memory cell array including a first memory region and a second memory region;
   a plurality of register sets for storing a plurality of parameter sets; and
   a control logic circuit configured to,
      load each of the plurality of parameter sets into each of the plurality of register sets,
      select a first register set among the plurality of register sets in response to a selection signal, and
      perform an access operation on the first memory region using a parameter set stored in the first register set from among the plurality of register sets,
   wherein the parameter set stored in the first register set is loaded into the first register set before the first register set is selected in response to the selection signal.

2. The semiconductor device of claim 1, wherein each of the plurality of parameter sets includes a plurality of parameters related to at least one of a write command, a read command, or an erase command.

3. The semiconductor device of claim 1, wherein,
   the plurality of parameter sets are stored in the second memory region, and
   the control logic circuit is configured to load the plurality of parameter sets stored in the second memory region to the plurality of register sets.

4. The semiconductor device of claim 3, wherein the control logic circuit is configured to load the plurality of parameter sets from the second memory region to the plurality of register sets when the semiconductor device is booted or initiated.

5. The semiconductor device of claim 1, wherein the control logic circuit is configured to receive the plurality of parameter sets from a controller.

6. The semiconductor device of claim 5, wherein the control logic circuit is configured to store the plurality of parameter sets stored in the plurality of register sets in the second memory region.

7. The semiconductor device of claim 1, wherein the control logic circuit is configured to,
   receive a command and the plurality of parameter sets from a controller, and
   store the plurality of parameter sets in the plurality of register sets in response to the command.

8. The semiconductor device of claim 1, wherein the control logic circuit is configured to select the first register set based on a command including the selection signal.

9. The semiconductor device of claim 1, wherein the semiconductor device is a NAND-type flash memory device, the memory cell array includes a plurality of memory cells, and each of the plurality of memory cells is a three-dimensional memory cell.

10. A data storage device comprising:
    a semiconductor device; and
    a controller for controlling the semiconductor device,
    wherein the semiconductor device includes,
       a memory cell array including a first memory region and a second memory region,
       a plurality of register sets for storing a plurality of parameter sets, and
       a control logic circuit configured to,
          load each of the plurality of parameter sets into each of the plurality of register sets,
          select a first register set among the plurality of register sets in response to a selection signal output from the controller, and
          access the first memory region based on a first command output from the controller and a parameter set stored in the first register set from among the plurality of register sets, wherein the parameter set stored in the first register set is loaded into the first register set before the first register set is selected in response to the selection signal.

11. The data storage device of claim 10, wherein the control logic circuit is configured to load the plurality of parameter sets stored in the second memory region to the plurality of register sets when the data storage device is booted or initiated.

12. The data storage device of claim 10, wherein the controller is configured to generate the plurality of parameter sets, and the control logic circuit is configured to receive the plurality of parameter sets from the controller.

13. The data storage device of claim 10, wherein the controller is configured to generate the selection signal based on at least one of a frequency of access to the first memory region or characteristics of the first memory region.

14. The data storage device of claim 13, wherein the characteristics of the first memory region include a state or an operating temperature of each of memory cells included in the first memory region, and the frequency of access includes a number of write operations or a number of read operations on the first memory region.

15. The data storage device of claim 10, wherein the selection signal is included in the first command or included in a second command that is different from the first command.

16. A semiconductor device comprising:
a memory cell array;
a plurality of register sets; and
a control logic circuit configured to,
    load each of a plurality of parameter sets into each of the plurality of register sets,
    select a first register set among the plurality of register sets based on a selection signal, the selection signal including information indicating the first register set, and
    perform an access operation on the memory cell array using a parameter set stored in the selected first register set from among the plurality of register sets,
wherein the parameter set stored in the first register set is loaded into the first register set before the first register set is selected in response to the selection signal.

17. The semiconductor device of claim 16, wherein in the control logic circuit is configured to receive a command, and the command includes the selection signal.

18. The semiconductor device of claim 16, wherein,
the memory cell array includes a first memory region and a second memory region, the second memory region being separate from the first memory region,
the control logic circuit is configured to load the plurality of parameter sets from the second memory region into the plurality of register sets, and
the control logic circuit is configured to perform the access operation on the first memory region.

19. A data storage device comprising:
the semiconductor device of claim 16; and
a controller for controlling the semiconductor device.

20. The data storage device of claim 19, wherein the controller is configured to generate the plurality of parameter sets, and the control logic circuit is configured to receive the plurality of parameter sets from the controller.

* * * * *